US009596657B2

(12) United States Patent
Kimura et al.

(10) Patent No.: US 9,596,657 B2
(45) Date of Patent: Mar. 14, 2017

(54) COMMUNICATION CONTROL DEVICE, TRANSMISSION POWER ALLOCATION METHOD AND PROGRAM

(71) Applicant: Sony Corporation, Tokyo (JP)

(72) Inventors: Ryota Kimura, Tokyo (JP); Ryo Sawai, Tokyo (JP)

(73) Assignee: Sony Corporation (JP)

( * ) Notice: Subject to any disclaimer, the term of this patent is extended or adjusted under 35 U.S.C. 154(b) by 35 days.

(21) Appl. No.: 14/372,329

(22) PCT Filed: Nov. 28, 2012

(86) PCT No.: PCT/JP2012/080737
§ 371 (c)(1),
(2) Date: Jul. 15, 2014

(87) PCT Pub. No.: WO2013/111442
PCT Pub. Date: Aug. 1, 2013

(65) Prior Publication Data
US 2014/0341150 A1    Nov. 20, 2014

(30) Foreign Application Priority Data

Jan. 24, 2012  (JP) .................................. 2012-011736

(51) Int. Cl.
*H04B 17/382* (2015.01)
*H04W 52/04* (2009.01)
(Continued)

(52) U.S. Cl.
CPC ............. *H04W 52/04* (2013.01); *H04W 4/00* (2013.01); *H04W 24/02* (2013.01); *H04W 52/24* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 7,130,653 B2 * 10/2006 Lin ....................... H04W 52/52
370/318
8,086,258 B2  12/2011 Fujii et al.
(Continued)

FOREIGN PATENT DOCUMENTS

EP        1944881 A2    7/2008
JP        2009-100452 A  5/2009
(Continued)

OTHER PUBLICATIONS

International Search Report from International Publication PCT/JP2012/080737 mailed Feb. 5, 2013.
(Continued)

*Primary Examiner* — Mark Rinehart
*Assistant Examiner* — Sanjay K Dewan
(74) *Attorney, Agent, or Firm* — Lerner, David, Littenberg, Krumholz & Mentlik, LLP

(57) ABSTRACT

There is provided a doing apparatus including a communication control device including a power allocation unit configured to allocate transmission power for secondary use of a frequency channel protected for a primary system to a secondary system. The power allocation unit switches power allocation methods between a first group of secondary systems of which a distance from the primary system is less than a prescribed threshold and a second group of secondary systems of which a distance from the primary system exceeds the prescribed threshold.

4 Claims, 7 Drawing Sheets

(51) Int. Cl.
- *H04W 4/00* (2009.01)
- *H04W 52/28* (2009.01)
- *H04W 24/02* (2009.01)
- *H04W 16/14* (2009.01)
- *H04W 52/24* (2009.01)
- *H04B 17/354* (2015.01)
- *H04W 52/22* (2009.01)

(52) U.S. Cl.
CPC ......... *H04W 52/283* (2013.01); *H04B 17/354* (2015.01); *H04W 16/14* (2013.01); *H04W 52/228* (2013.01); *H04W 52/242* (2013.01); *H04W 52/244* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 8,249,631 | B2* | 8/2012 | Sawai | H04W 52/243 455/135 |
| 8,577,406 | B2 | 11/2013 | Sawai et al. | |
| 2006/0281422 | A1* | 12/2006 | Pan | H01Q 1/2216 455/127.1 |
| 2007/0133708 | A1* | 6/2007 | Lee | H04B 7/0434 375/267 |
| 2008/0182611 | A1* | 7/2008 | Han | H04W 52/42 455/522 |
| 2010/0061359 | A1* | 3/2010 | Fukuoka | H04J 11/0026 370/342 |
| 2010/0330919 | A1* | 12/2010 | Gurney | H04W 52/367 455/67.11 |
| 2011/0034204 | A1* | 2/2011 | Sawai | H04W 4/02 455/522 |
| 2011/0038627 | A1* | 2/2011 | Ciaramella | H04J 14/0221 398/38 |
| 2012/0020286 | A1* | 1/2012 | Damnjanovic | H04W 52/281 370/328 |
| 2012/0224545 | A1* | 9/2012 | Ohta | H04W 72/0473 370/329 |
| 2012/0320869 | A1* | 12/2012 | Stadelmeier | H04B 7/0426 370/329 |
| 2013/0102319 | A1* | 4/2013 | Yamazaki | H04W 52/243 455/450 |
| 2013/0316756 | A1 | 11/2013 | Sawai et al. | |

FOREIGN PATENT DOCUMENTS

| | | |
|---|---|---|
| JP | 2010011350 A | 1/2010 |
| JP | 2011010265 A | 1/2011 |
| JP | 2011-055463 A | 3/2011 |
| SG | 188583 A1 | 4/2013 |
| WO | 2008063820 A1 | 5/2008 |
| WO | 2011-132760 A1 | 10/2011 |
| WO | 2011-158502 A1 | 12/2011 |

OTHER PUBLICATIONS

Electronic Communications Committee (ECC) within the European Conference of Postal and Telecommunications Administrations (CEPT), "Technical and Operational Requirements for the Possible Operation of Cognitive Radio Systems in the 'White Spaces' of the Frequency Band 470-790 MHz", ECC Report 159, Cardiff, Jan. 2011.

"Standard ECMA-392 MAC and PHY for Operation in TV White Space", [online], [retrieved on Dec. 15, 2011], the Internet <URL:http://www.ecma-international.org/publications/standards/Ecma-392.htm>.

Insternational Search Report for Singapore Application No. 11201404200U, dated Apr. 27, 2015.

Japanese Office Action for JP Application No. 2013555140, dated Sep. 29, 2015.

European Search Report for EP 12866905.8 Dated Dec. 22, 2015.

Written Opinion from Singapore for Application No. 11201404200U dated Jun. 2, 2016.

Japanese Office Action for Application No. 2016-015260 dated Dec. 6, 2016.

* cited by examiner

COMMUNICATION CONTROL DEVICE, TRANSMISSION POWER ALLOCATION METHOD AND PROGRAM

CROSS-REFERENCE TO RELATED APPLICATION

The present application is a national phase entry under 35 U.S.C. §371 of International Application No. PCT/JP2012/080737 filed Nov. 28, 2012, published on Aug. 1, 2013 as WO 2013/111442 A1, which claims priority from Japanese Patent Application No. JP 2012-011736, filed in the Japanese Patent Office on Jan. 24, 2012.

TECHNICAL FIELD

The present disclosure relates to a communication control device, a transmission power allocation method and program.

BACKGROUND ART

Secondary usage of a frequency is discussed as a measure for alleviating future depletion of frequency resources. The secondary usage of a frequency means that part of or all the frequency channels preferentially allocated for a system is secondarily used by the other system. Typically, a system which is preferentially allocated with a frequency channel is called a primary system and a system which secondarily uses the frequency channel is called a secondary system.

A TV white space is an exemplary frequency channel whose secondary usage is discussed (see Non-Patent Literature 1). The TV white space is a channel which is not used by a TV broadcast system depending on an area among frequency channels allocated for the TV broadcast system as a primary system. The TV white space is opened to a secondary system so that efficient utilization of the frequency resource is to be achieved. A standard for a physical layer (PHY) and a MAC layer for enabling the secondary usage of the TV white space can include IEEE802.22, IEEE802.11af and ECMA (European Computer Manufacturer Association)-392 (CogNea, see Non-Patent Literature 2 described later).

In the secondary usage of a frequency band, in general, the secondary system is required to be operated so as not to give a detrimental interference to the primary system. In order to do so, one of the important technologies is transmission power control. For example, Patent Literatures 1 described later proposes an approach to determine the maximum transmission power of a secondary system in response to a path loss of a path between the base station of the secondary system and the receiver device of the primary system.

CITATION LIST

Non-Patent Literature

Non-Patent Literature 1: Electronic Communications Committee (ECC) within the European Conference of Postal and Telecommunications Administrations (CEPT), "TECHNICAL AND OPERATIONAL REQUIREMENTS FOR THE POSSIBLE OPERATION OF COGNITIVE RADIO SYSTEMS IN THE 'WHITE SPACES' OF THE FREQUENCY BAND 470-790 MHz", ECC REPORT 159, Cardiff, January 2011

Non-Patent Literature 2: "Standard ECMA-392 MAC and PHY for Operation in TV White Space", [online], [retrieved on Dec. 15, 2011], the Internet <URL:http://www.ecma-international.org/publications/standards/Ecma-392.htm>

Patent Literature

Patent Literature 1: JP2009-100452A

SUMMARY OF INVENTION

Technical Problem

In the situation in which plural secondary systems can possibly be present, it would be beneficial to control the transmission power of each secondary system so that accumulative interferences from the plural secondary systems fall within an acceptable range of the primary system. In addition, when the transmission power of the secondary systems is not small, consideration of interference between channels may possibly become necessary. However, in order to accurately evaluate such various factors for all of the secondary systems, calculation cost for allocating the transmission power will increase, and extra load will be imposed on a control node controlling the secondary use.

Accordingly, it is desirable that a system be provided that suppresses the load to calculate the transmission power of the secondary systems and that appropriately prevents detrimental interference to the primary system.

Solution to Problem

According to the present invention, there is provided a doing apparatus including a communication control device including a power allocation unit configured to allocate transmission power for secondary use of a frequency channel protected for a primary system to a secondary system. The power allocation unit switches power allocation methods between a first group of secondary systems of which a distance from the primary system is less than a prescribed threshold and a second group of secondary systems of which a distance from the primary system exceeds the prescribed threshold.

In addition, according to the present invention, there is provided a method for allocating transmission power for secondary use of a frequency channel protected for a primary system to a secondary system, the method including obtaining a distance to the secondary system from the primary system, allocating transmission power to the secondary system with the first power allocation method when the obtained distance is less than a prescribed threshold, and allocating transmission power to the secondary system with the second power allocation method that requires calculation cost lower than that of the first power allocation method when the obtained distance exceeds the prescribed threshold.

In addition, according to the present invention, there is provided a program for causing a computer of a communication control device to function as a power allocation unit to allocate transmission power for secondary use of a frequency channel protected for a primary system to a secondary system. The power allocation unit switches power allocation methods between a first group of secondary systems of which a distance from the primary system is less than a prescribed threshold and a second group of secondary systems of which a distance from the primary system exceeds the prescribed threshold.

Advantageous Effects of Invention

According to the technology related to the present disclosure, it is possible to suppress load to calculate transmission power of the secondary systems and to appropriately prevent detrimental interference to the primary system.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

A description will be given in the following order.
1. Outline of system
2. Exemplary configuration of secondary system manager
2-1. Explanation of units
2-2. Flow of process
3. Exemplary configuration of master node
4. Conclusion 1. Outline of System First, with reference to FIG. 1 to FIG. 4, a description will be given of an outline of a communication control system according to an embodiment.
[1-1. Problem Relating to One Embodiment]

Figure 1:
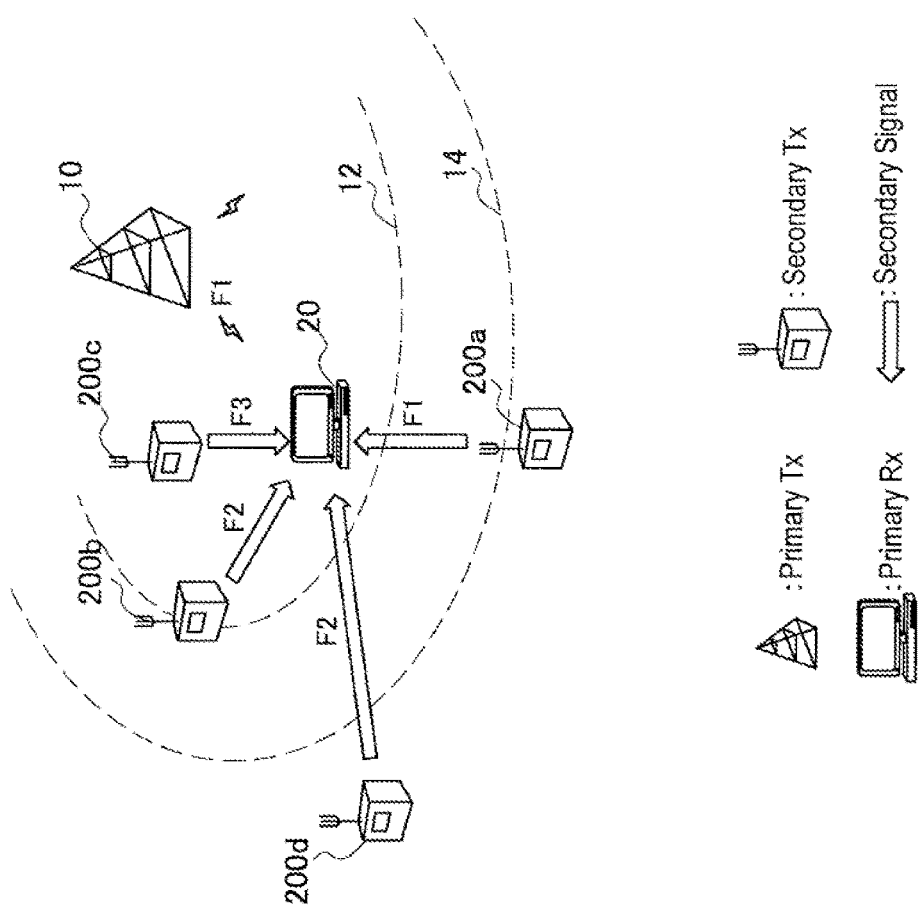
FIG. 1 is an explanatory diagram for explaining an interference a node of a primary system suffers upon secondary usage of a frequency.

FIG. 1 is an explanatory diagram for explaining an interference a node of a primary system suffers upon secondary usage of a frequency. With reference to FIG. 1, there are illustrated a primary transmission station 10 for providing services of the primary system, and a primary reception station 20 located inside a boundary 12 of a service area for the primary system. The primary transmission station 10 may be a TV broadcast station, or a wireless base station or repeater station in a cellular communication system, for example. The cellular communication system may include the GSM, UMTS, WCDMA, CDMA2000, LTE, LTE-Advanced, IEEE802.16, WiMAX or WiMAX2, and the like. When the primary transmission station 10 is a TV broadcast station, the primary reception station 20 is a receiver having an antenna and a tuner for receiving TV broadcast. When the primary transmission station 10 is a wireless base station in a cellular communication system, the primary reception station 20 is a wireless terminal operating in accordance with the cellular communication system. In the example of FIG. 1, a channel F1 is allocated for the primary transmission station 10. The primary transmission station 10 can provide TV broadcast services, wireless communication services or some other wireless services by transmitting wireless signals on the channel F1. Note that the embodiment is not limited to the example in FIG. 1, but plural frequency channels can be allocated for the primary system.

FIG. 1 further shows master nodes 200a, 200b, 200c, and 200d each operating the secondary system. Each of the master nodes uses the channel F1 allocated for the primary system or an adjacent channel F2 or F3 to operate the secondary system respectively. Each master node may be a wireless access point which is compliant with or partially uses a wireless communication system such as IEEE802.22, IEEE802.11, or ECMA, or may be a wireless base station or repeater station which is compliant with the cellular communication system or partially uses standards thereof. If the secondary system is operated in accordance with the cellular communication system, the cellular communication system may be the same as or different from a system of the primary system. One or more slave nodes (not shown) for the secondary system may exist around each master node. Slave nodes support the same wireless communication system as the master node which they are connected to. In the example of FIG. 1, a master node 200a located outside a boundary 14 of a guard area uses the channel F1. Master nodes 200b and 200c located inside the guard area use the channels F2 and F3, respectively, adjacent to the channel F1. A master node 200d located outside the boundary 14 of the guard area uses the channel F2.

Figure 2:
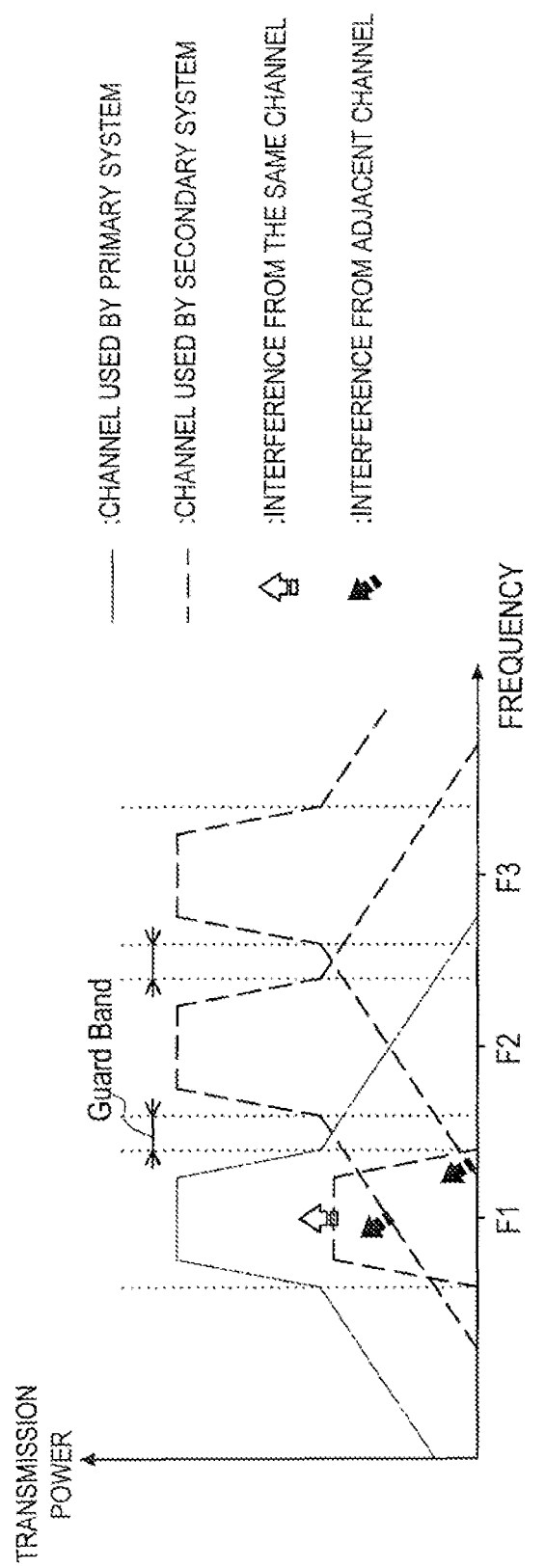
FIG. 2 is an explanatory diagram for explaining an interference in a channel and an interference between channels.

Under the circumstances such as of FIG. 1, the primary reception station 20 may be influenced by an interference due to the wireless signals transmitted from secondary transmission stations (both master node and slave node). FIG. 2 is an explanatory diagram for explaining an interference in channel (in-band) and an interference between channels. In the example of FIG. 2, the channel F1 is a channel used by the primary system. If the master node 200a in FIG. 1 secondarily uses this channel F1, an interference may occur in the same channel. The channel F2 is a channel adjacent to the channel F1. The channel F3 is a channel adjacent to the channel F2. A guard band is provided between the channel F1 and the channel F2, and between the channel F2 and the channel F3. When these channels F2 and F3 are used by other system, the primary system is ideally to suffer no interference. However, as illustrated in FIG. 2, actually a considerable interference may occur from an adjacent channel (such as channels F2, F3 and other channels) due to out-band radiation.

Figure 3:
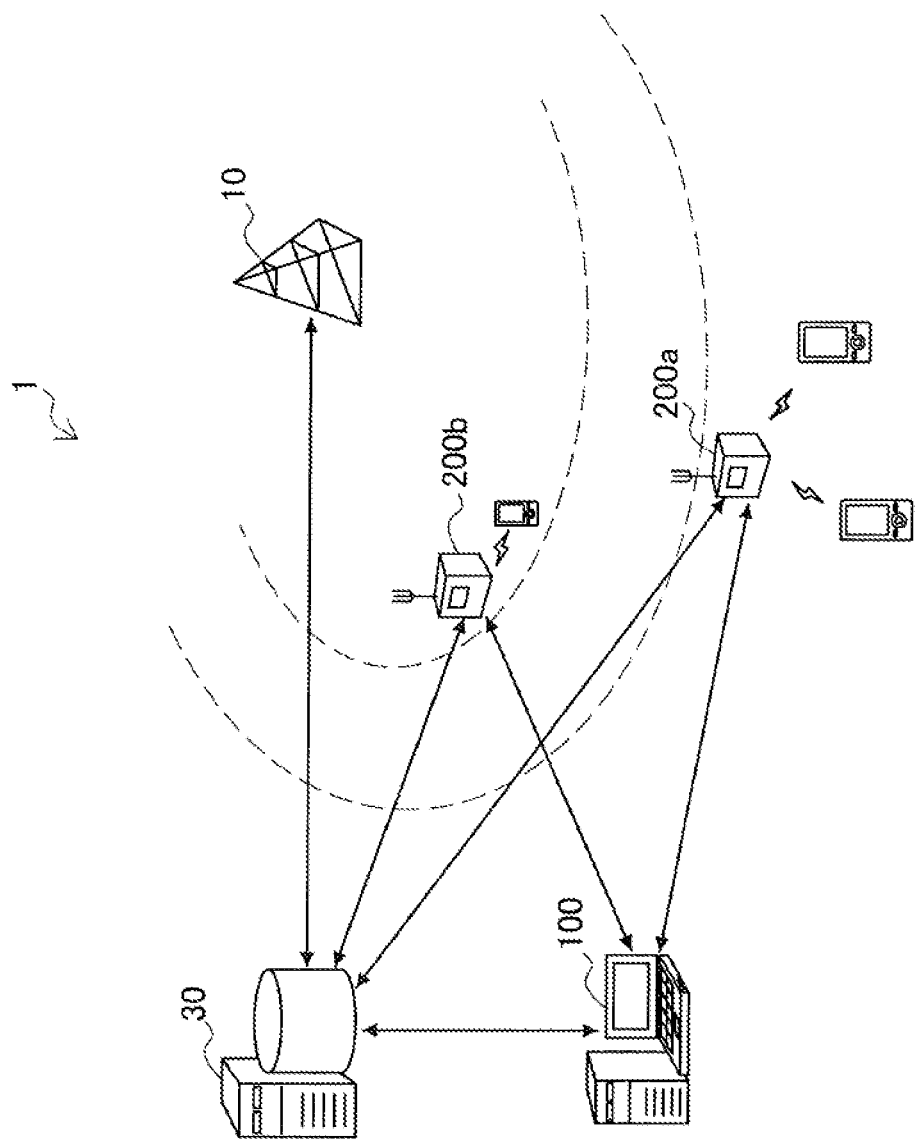
FIG. 3 is an explanatory diagram for explaining a configuration of a communication control system according to one embodiment.

The transmission power of the secondary system can be controlled in the system exemplified in FIG. 3 so as not to give a detrimental effect on the primary system that should be protected from this interference due to the wireless signals from secondary system.

FIG. 3 is an explanatory diagram for explaining a communication control system according to one embodiment. With reference to FIG. 3, the communication control system 1 includes a primary transmission station 10, data server 30, communication control device 100, and master nodes 200a and 200b. Here, in the example of FIG. 3, only the master nodes 200a and 200b are illustrated as a master node operating the secondary system, but actually more master nodes may exist. Unless otherwise the master nodes 200a and 200b (and other master nodes) need to be distinguished from each other in the explanation of this description below, an alphabetical character suffixed to a symbol is omitted to collectively refer to these as the master node 200.

The data server 30 is a server device having a database storing therein data about the secondary usage. The data server 30 accepts an access from the master node 200 to provide data indicating secondarily usable channels and position data of the transmission station 10 of the primary system to the master node 200. Additionally, the master node 200 registers information on the secondary system in the data server 30 at the start of the secondary usage. Communication between the data server 30 and the master node 200 may be made via an arbitrary network such as the Internet. Refer to Non-Patent Literature 1 describing the secondary usage of the TV white space as to an exemplary specification of the data server like this.

The communication control device 100 has a function as a secondary system manager which allocates the transmission power for the secondary usage of the frequency channel to the secondary system such that the accumulative interferences from a secondary system give no detrimental effect to primary system. The communication control device 100 can access to the data server 30 via a network such as the Internet, for example, and acquires data used for allocating the transmission power from the data server 30. In addition, the communication control device 100 is communicably connected with also each master node 200. Then the communication control device 100, in response to a request from the master node 200 or primary system, or periodically, adjusts the transmission power for the secondary system. Note that, without limited to the example of FIG. 3, the communication control device 100 may be mounted on the physically same device as the data server 30 or any of the master nodes 200.

Figure 4:
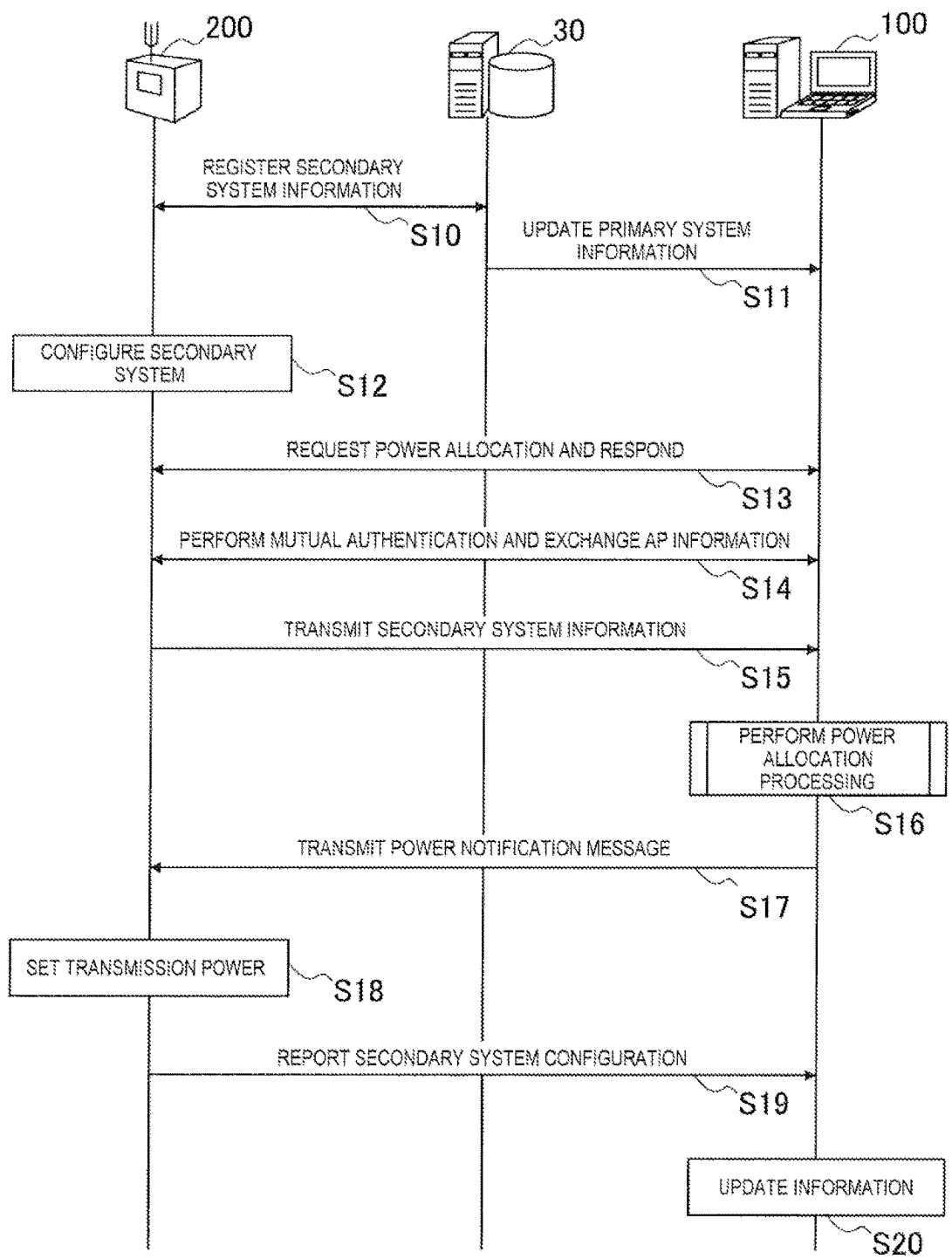
FIG. 4 is a sequence diagram illustrating an exemplary schematic flow of a communication control processing performed in the communication control system according to one embodiment.

FIG. 4 is a sequence diagram illustrating an exemplary schematic flow of an communication control processing performed in the communication control system 1.

First, the master node 200, before starting to operate the secondary system, registers information on the secondary system in the data server 30 (step S10). The information registered here may include, for example, a device ID, class and position data of the master node 200 and the like. Moreover, in response to registration of the information on the secondary system, the data server 30 notifies the master node 200 of information for configuring the secondary system such as a list of channel numbers of secondarily usable frequency channels, acceptable maximum transmission power, and spectrum mask. Here, an access cycle from the master node 200 to the data server 30 may be decided on the basis of provisions of law regarding frequency usage regulation. For example, the FCC (Federal Communications Commission) is considering a requirement that if the position of the master node varies, the position data should be updated at least every 60 seconds. In addition, it has been recommended that the list of the usable channel numbers should be checked by the master node at least every 30 seconds. However, increase in the access to the data server 30 leads to increase in overhead. Therefore, the access cycle to the data server 30 may be set to a longer cycle (e.g., integral multiple of the regulated cycle and so on). Moreover, the access cycle may be dynamically set depending on the number of active nodes (e.g., if the number of nodes is small, a risk of interference is low so that the cycle may be set longer). The data server 30 may instruct the master node 200 about the access cycle upon an initial registration of the information on the secondary system, for example.

Further, the communication control device 100 receives information on the primary system from the data server 30 periodically, for example, and uses the received information to update information stored in itself (step S11). The information received here may include one or more of the position data of the primary transmission station 10, height of an antenna, width of the guard area, list of the channel numbers of the frequency channels, acceptable interference amount of the primary system, position data of a reference point for interference calculation described later, list of IDs of the registered master nodes 200, and other parameters (e.g., ACLR (adjacent channel leakage ratio), fading margin, shadowing margin, protection ratio, ACS (adjacent channel selection) and the like). Here, the communication control device 100 may indirectly receive all or a part of the information on the primary system (e.g., list of the channel numbers and the like) from the master node 200.

Next, the master node 200 configures the secondary system on the basis of the information notified by the data server 30 (step S12). For example, the master node 200 selects one or more channels from the secondarily usable frequency channels as a use channel for the secondary system. Then, a request for power allocation is transmitted from the master node 200 (or the data server 30) to the communication control device 100 (step S13).

When an acknowledge is returned to the request for power allocation, mutual authentication and application level information exchange are performed between the communication control device 100 and the master node 200 (step S14). Additionally, the information on the secondary system is transmitted from the master node 200 to the communication control device 100 (step S15). The information transmitted here may include a device ID of the master node 200, class, position data, channel number of the frequency channel (use channel) selected by the master node 200, information on a communication quality requirement (including a QoS (Quality of Service) requirement), priority information, communication history and the like.

Next, the communication control device 100 performs a power allocation processing on the basis of the information acquired from the data server 30 and the master node 200 (step S16). The power allocation processing here by the communication control device 100 will be described in detail later. Then, the communication control device 100 transmits a power notification message for notifying a newly allocated transmission power to the master node 200 (step S17).

The master node 200, in receiving the power notification message, sets an output level of a transmitting circuit in itself in accordance with a value of the notified transmission power (step S18). Further, the master node 200 may instruct a slave node connected with itself about a value of the transmission power to be used. The master node 200, in completing the setting of the transmission power, reports the secondary system configuration to the communication control device 100 (step S19). Then, the communication control device 100 updates the information on secondary system stored in itself in response to the report from the master node 200 (step S20).

In the above-described sequence, in the power allocation processing performed by the communication control device 100 in step S16, there are some aspects to be considered in accordance with the situations.

The first aspect is a path loss for each secondary system. In general, the greater the path-loss from a secondary system to a primary system is, the lower the interference level that the primary system receives becomes. Consequently, by allocating greater transmission power to a secondary system located farther away from the primary system, throughput of the secondary system can be enhanced. However, because there is an upper limit to the transmission power that can be output from the nodes of the secondary system (both master node and slave node), when the distance of the secondary system from the primary system exceeds a certain value, it is no longer significant to consider the path loss.

The second aspect is accumulative interferences from plural secondary systems to a primary system. Generally, in order to appropriately protect the primary system, when plural secondary systems are present, it is desirable that the transmission power is controlled so that the accumulative interferences from these plural secondary systems give no detrimental effect to the primary system. However, calculation of accumulative interferences of secondary systems having an interference level sufficiently smaller than the acceptable interference level of the primary system brings a disadvantage of increase in calculation load.

The third aspect is the interference between channels. Generally, in order to appropriately protect a primary system, it is desirable that the transmission power is controlled so that the interference from the secondary system gives no detrimental effect to the primary system after the interference between channels is properly evaluated. However, when only an interference on the same channel is considered, simple calculation of the transmission power can be made independently for each channel, whereas when the interference between channels is considered, the transmission power needs to be distributed in a comprehensible manner over the plural secondary systems that secondarily use channels different from one another. Because when the number of channels increases, combinations of channels that may cause the interference between channels also increase, such calculation load becomes significantly large. Accordingly, it is a beneficial option not to consider the interference between channels for the secondary systems with a small interference level.

In view of the above, the communication control device 100, when allocating the transmission power to a secondary system, prevents a detrimental effect on the primary system while suppressing calculation load by switching power allocation methods in accordance with the distance of the secondary system from the primary system.

2. Exemplary Configuration of Secondary System Manager

Figure 5:
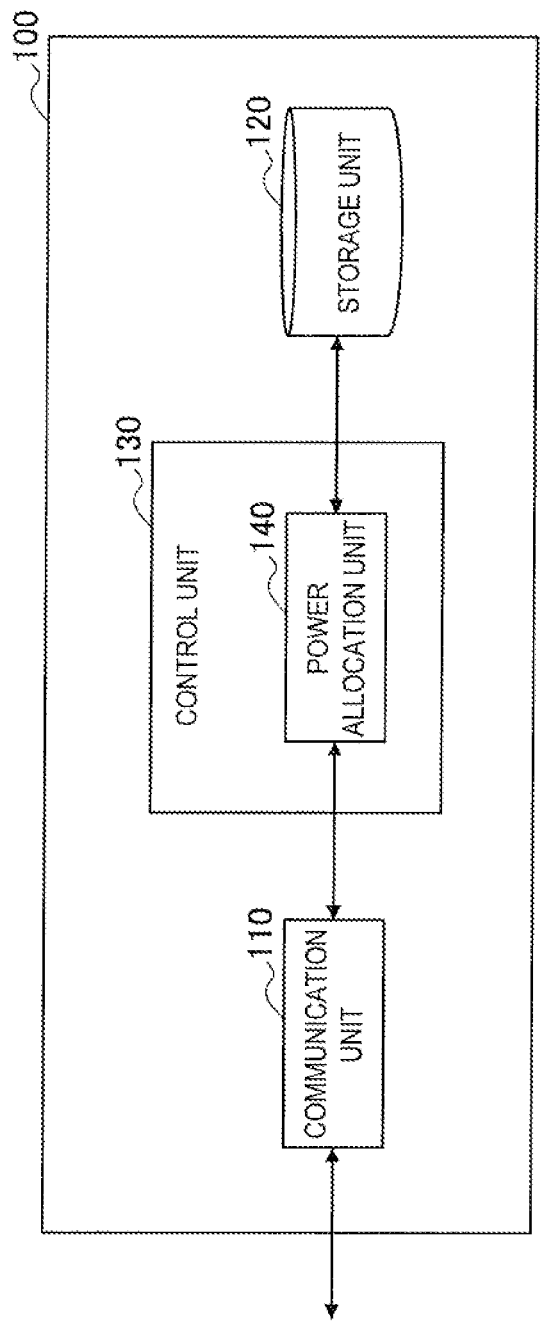
FIG. 5 is a block diagram illustrating an exemplary configuration of the communication control device according to one embodiment.

FIG. 5 is a block diagram illustrating an example of the configuration of the communication control device 100 (i.e., the secondary system manager) illustrated in FIG. 3. With reference to FIG. 5, the communication control device 100 is provided with a communication unit 110, a storage unit 120 and a control unit 130. The control unit 130 includes a power allocation unit 140.

[2-1. Explanation of Units]

The communication unit 110 is a communication interface for communication of the communication control device 100 with the data server 30 and with the master node 200. Communication between the communication control device 100 and the data server 30, and between the communication control device 100 and the master node 200 may be achieved by any of a wired communication or wireless communication, or a combination thereof.

The storage unit 120 stores a program and data for operation for the communication control device 100 using a storage medium such as a hard disk or semiconductor memory. For example, the storage unit 120 stores the information on the primary system received from the data server 30 and the information on the secondary system received from the master node 200 of each secondary system.

The control unit 130 corresponds to a processor such as CPU (Central Processing Unit) or DSP (Digital Signal Processor). The control unit 130 causes various functions of the communication control device 100 by executing programs stored in the storage unit 120 or other storage media.

The power allocation unit 140 allocates for the secondary system the transmission power for the secondary usage of a frequency channel protected for the primary system. The frequency channel protected for the primary system may include one or more frequency channel allocated for the primary system and its adjacent frequency channels. In the present embodiment, the power allocation unit 140 switches the power allocation methods between the first group of secondary systems of which the distance from the primary system is less than a prescribed distance threshold value and the second group of secondary systems of which the distance from the primary system is greater than the distance threshold value. The distance of a secondary system from a primary system may be, for example, a distance from the center of the service area of the primary system, or may be a distance from an outer edge of the service area or the guard area.

(Examples of power allocation methods)

In this description, the following four methods are mainly explained as power allocation methods performed by the power allocation unit 140. However, these are mere examples, and other power allocation methods may be used.

(1) The first method: Fixed power allocation
(2) The second method: Considering path loss
(3) The third method: Considering accumulative interferences
(4) The fourth method: Considering interference between channels (1) The First Method In the first method, for each secondary system, a fixed transmission power value or a transmission power value requested from the secondary system is allocated. The fixed transmission power value may be commonly defined among all secondary systems, or may be defined for each attribute such as a type and a class of a device. In this case, the calculation cost required to calculate the transmission power is substantially close to zero.

(2) The Second Method

In the second method, a larger transmission power value is allocated for each secondary system as the path loss from the secondary system to the primary system is greater. The calculation formula of the transmission power allocated for each secondary system may be, for example, the calculation formula described in the above-described Patent Document 1. Other examples of the calculation formula are further provided later. In this case, the calculation cost required to calculate the transmission power is not zero, but is relatively small.

(3) The Third Method

In the third method, the transmission power is distributed to each secondary system so that an accumulative interference amount on the same channel from plural secondary systems to a primary system does not exceed an acceptable interference amount of the primary system.

The third method may be, for example, a method based on the interference control model explained below. Note that here, formulas of the interference control model are written by using the true value expression, but this interference control model can handle the decibel value expression by converting the formulas.

First, given that a reference point for the interference calculation is i, the frequency channel allocated for the primary system is $f_j$, the acceptable interference amount of the primary system is $I_{acceptable}(i, f_j)$. Additionally, assuming that a single secondary system k which secondarily uses the channel $f_j$ is located on a periphery of the guard area. Accordingly, a relation expression below holds among a maximum transmission power $P_{max}(f_j, k)$ of the secondary system, a path loss $L(i, f_j, k)$ for a minimum separation distance (width of the guard area), and an acceptable interference amount $I_{acceptable}(i, f_j)$.

$$I_{acceptable}(i,f_j) = P_{max}(f_j,k) \cdot L(i,f_j,k) \quad (1)$$

Here, a position of the reference point is decided on the basis of the information the communication control device 100 receives from the data server 30 at step S11 in FIG. 4. In a case where the reference point is defined in advance, the position data (e.g., longitude and latitude, etc.) representing the position of the relevant reference point may be received from the data server 30. Additionally, the communication control device 100 may use the position data of the node, service area, or guard area of the primary system received from the data server 30, and the position data received from each master node 200 to dynamically decide the position of the reference point.

When there are plural secondary systems of the same group that use the same frequency channel, in the transmission power allocation for each of the secondary systems, the following relation expression (an evaluation formula of accumulative interference amount) obtained by expanding Formula (1) needs to be satisfied for each frequency channel.

$$I_{acceptable}(i, f_j) \geq \sum_{k=1}^{M_j} P(f_j, k) \cdot L(i, f_j, k) \cdot G(f_j, k) \quad (2)$$

Here, a right-hand side in Formula (2) represents the sum of interference amounts caused by the secondary systems to which secondarily use a channel the same as the channel $f_j$ allocated for the primary system. $M_j$ is the number of the secondary systems which secondarily use the same channel, $P(f_j, k)$ is a power allocated for the k-th secondary system, $L(i, f_j, k)$ is a path loss between the k-th secondary system and the reference point i of the primary system, and $G(f_j, k)$ is a gain component. Note that the above $M_j$ may be the number of the active secondary systems (or master nodes).

In the third power allocation method, for each frequency channel, the power allocation unit 140, after tentatively distributing the transmission power to secondary systems that secondarily uses the frequency channel, corrects the distributed transmission power so as to satisfy the above evaluation formula of the accumulative interference amount.

The tentative distribution of the transmission power may be performed in accordance with, for example, three types of methods including the fixed margin method, the even method, and the uneven method that are explained below. Note that the power distribution formulas in these methods may be used as the calculation formula of the transmission power for the second power allocation method.

(Fixed Margin Method)

A first method is a fixed margin method. In a case of the fixed margin method, a distribution margin MI (and safety margin SM) fixedly set in advance is used to calculate the transmission power allocated to each secondary system. A transmission power $P(f_j, k)$ which is allocated to the k-th secondary system to use the frequency channel $f_j$ is derived from a formula below.

$$P(f_j,k) = I_{acceptable}(i,f_j)/L(i,f_j,k) \cdot G(f_j,k) \cdot MI \cdot SM \quad (3)$$

(Even Method)

A second method is an even method. In a case of the even method, the transmission powers allocated to respective secondary systems are equal to each other. In other words, the transmission power is evenly distributed to a plurality of secondary systems. The transmission power $P(f_j, k)$ which is allocated to the k-th secondary system to use the frequency channel $f_j$ is derived from a formula below.

$$P(f_j, k) = I_{acceptable}(i, f_j) \Big/ \sum_{kk=1}^{M_j} \{L(i, f_j, kk) \cdot G(f_j, kk)\} \quad (4)$$

(Uneven Method)

A third method is an uneven method. In a case of the uneven method, the secondary system has the larger distance to the primary system, the secondary system is allocated with the more transmission power. Accordingly, chances of the secondary usage as a whole may be increased. The transmission power $P(f_j, k)$ allocated to the k-th secondary system to use the frequency channel $f_j$ is derived from a formula below.

$$P(f_j,k) = I_{acceptable}(i,f_j)/\{(L(i,f_j,k) \cdot G(f_j,k) \cdot M_j\} \quad (5)$$

Moreover, the even method and the uneven method may be combined with an interference-causing margin reduction method described below.

(Interference-Causing Margin Reduction Method)

The interference-causing margin reduction method is a method in which the safety margin SM for reducing an interference risk is counted, and may be used in combination with the even method or uneven method described above. The transmission power $P(f_j, k)$ is derived from Formula (6) below in terms of the combination with the even method, and Formula (7) below in terms of the combination with uneven method. Here, SM represents a safety margin set in advance or notified from the master node 200.

$$P(f_j, k) = I_{acceptable}(i, f_j) \Big/ \sum_{kk=1}^{M_j} \{L(i, f_j, kk) \cdot G(f_j, kk) \cdot SM\} \quad (6)$$

$$P(f_j, k) = I_{acceptable}(i, f_j) / \{L(i, f_j, k) \cdot G(f_j, k) \cdot M_j \cdot SM\} \quad (7)$$

Further, the methods described above may be combined with a weighted distribution method described below.

(Weighted distribution method)

The weighted distribution method is a method in which distribution of the transmission power is weighted depending on a priority for each the secondary system. The transmission power $P(f_j, k)$ is derived from Formula (8) below in terms of the combination with the even method, and Formula (9) below in terms of the combination with the uneven method. In addition, the transmission power $P(f_j, k)$ is derived from Formula (8') below in terms of the combination with the even method and interference-causing margin reduction method, and Formula (9') below in terms of the combination with the uneven method and interference-causing margin reduction method. Here, $w_k$ represents a weighting depending on the priority. Note that a weight $w_j$ for each frequency channel may be used in place of the weight $w_k$ for each secondary system.

$$P(f_j, k) = \left( w_k \bigg/ \sum_{kk=1}^{M_j} w_{kk} \right) I_{acceptable}(i, f_j) \bigg/ \sum_{kk=1}^{M_j} \{L(i, f_j, kk) \cdot G(f_j, kk)\} \quad (8)$$

$$P(f_j, k) = \left( w_k \bigg/ \sum_{kk=1}^{M_j} w_{kk} \right) I_{acceptable}(i, f_j) / \{L(i, f_j, k) \cdot G(f_j, k) \cdot M_j\} \quad (9)$$

$$P(f_j, k) = \quad (8')$$
$$\left( w_k \bigg/ \sum_{kk=1}^{M_j} w_{kk} \right) I_{acceptable}(i, f_j) \bigg/ \sum_{kk=1}^{M_j} \{L(i, f_j, kk) \cdot G(f_j, kk) \cdot SM\}$$

$$P(f_j, k) = \quad (9')$$
$$\left( w_k \bigg/ \sum_{kk=1}^{M_j} w_{kk} \right) I_{acceptable}(i, f_j) / \{L(i, f_j, k) \cdot G(f_j, k) \cdot M_j \cdot SM\}$$

Here, in the primary system there may be some cases where only the acceptable interference amount $I_{acceptable}(i, f_{jj})$ of the frequency channel $f_{jj}$ is defined and the acceptable interference amount of the adjacent frequency channel $f_j$ is not defined. For example, such a case may occur when the frequency channel $f_{jj}$ is a channel allocated to the primary system, and the adjacent channel $f_j$ thereof is a channel not used by the primary system but protected. In that case, a distribution formula for distributing the transmission power to the secondary systems which secondarily use the adjacent channel $f_j$ is derived by, in the distribution formulas described above, replacing the acceptable interference amount $I_{acceptable}(i, f_j)$ with the $I_{acceptable}(i, f_{jj})$ and replacing the term $L(i,f_j, k) \cdot G(f_j, k)$ of the path loss and gain component with a term $L(i,f_j,k) \cdot G(f_j, k)/H(f_{jj}, f_j, k)$ for counting the loss component. As an example, a distribution formula in the fixed margin method may be modified as below.

$$P(f_j, k) = I_{acceptable}(i, f_{jj}) \cdot H(f_{jj}, f_j, k)/L(i, f_j, k) \cdot G(f_j, k) \cdot MI \cdot SM \quad (3')$$

Next, the power allocation unit 140 searches in the service area of the primary system for a point at which evaluation of the interference amount on the basis of the distributed transmission power is the harshest. For example, a point i' at which the interference amount is the harshest is searched as in the following Formula (10) or Formula (10').

$$i' = \underset{i}{\mathrm{argmin}} \left( I_{acceptable}(i, f_j) - \sum_{k=1}^{M_j} P(f_j, k) \cdot L(i, f_j, k) \cdot G(f_j, k) \right) \quad (10)$$

$$i' = \underset{i}{\mathrm{argmin}} \left( I_{acceptable}(i, f_j) - \sum_{k=1}^{M_j} P(f_j, k) \cdot L(i, f_j, k) \cdot G(f_j, k) \cdot SM \right) \quad (10')$$

Next, the power allocation unit 140 calculates a correction coefficient $\Delta$ of power distribution as in the following formulas based on the total interference amount and the acceptable interference amount $I_{acceptable}(i, f_j)$ at the point i'.

$$\Delta = \frac{I_{acceptable}(i', f_j)}{\sum_{k=1}^{M_j} P(f_j, k) \cdot L(i', f_j, k) \cdot G(f_j, k)} \quad (11)$$

$$\Delta = \frac{I_{acceptable}(i', f_j)}{\sum_{k=1}^{M_j} P(f_j, k) \cdot L(i', f_j, k) \cdot G(f_j, k) \cdot SM} \quad (11')$$

Note that the above Formula (11') can be used when the interference-causing margin reduction method is applied in power distribution.

Then, the power allocation unit 140 corrects the transmission power in accordance with the following formula by using the calculated correction coefficient $\Delta$, and derives the acceptable transmission power $P'(f_j, k)$ of the secondary system k.

$$P'(f_j, k) = P(f_j, k) \cdot \Delta \quad (12)$$

(4) The Fourth Method

In the fourth method, the transmission power is distributed to each of secondary systems so that the sum of the accumulative interference amount on the same channel and the accumulative interference amounts between channels from plural secondary systems to a primary system does not exceed the acceptable interference amount of the primary system. The evaluation formula of the accumulative interference amount in the fourth method may be the following formula that introduces the term of the interference between channels into the right-hand side of the above Formula (2) in the third method.

$$I_{acceptable}(i, f_j) \geq \sum_{k=1}^{M_j} P(f_j, k) \cdot L(i, f_j, k) \cdot G(f_j, k) + \sum_{jj=1}^{O_j} \sum_{kk=1}^{N_{jj}} \{P(f_{jj}, kk) \cdot L(i, f_{jj}, kk) \cdot G(f_{jj}, kk)/H(f_j, f_{jj}, kk)\} \quad (13)$$

The second term on the right-hand side of Formula (13) represents the sum of the interference amount originating from the secondary systems which secondarily use a channel different from but adjacent to the channel $f_j$. $O_j$ is the number of the adjacent channels, jj is an index of the adjacent channels, $N_{jj}$ is the number of secondary systems that secondarily uses the adjacent channels, kk is an index of the secondary systems that secondarily uses the adjacent channels, $H(f_j, f_{jj}, kk)$ is a loss component of the secondary system kk from the adjacent channels $f_{jj}$ to the channel $f_j$. Note that $N_{jj}$ may be a number of the active secondary systems (or master nodes).

The gain component G in Formula (13) can be determined mainly on the basis of the causes shown in the following Table 1.

TABLE 1

| FACTOR OF GAIN COMPONENT BETWEEN SYSTEMS | |
|---|---|
| SYMBOLS | FACTOR |
| PR ($f_{jj} - f_j$) | Protection ratio between channels of which frequencies are separated $f_{jj} - f_j$ |
| $\mu_\sigma$ | Shadowing margin |
| $\sigma$ | Shadowing (standard deviation) |

TABLE 1-continued

FACTOR OF GAIN COMPONENT BETWEEN SYSTEMS

| SYMBOLS | FACTOR |
|---|---|
| $D_{dir}(i, f_{j\;(or\;jj)})$ | Signal identification degree of antenna directionality in primary reception station at reference point i in channel $f_j$(or $f_{jj}$) |
| $D_{pol}(i, f_{j\;(or\;jj)})$ | Signal identification degree of polarization in primary reception station at reference point i in channel $f_j$(or $f_{jj}$) |
| $G_{ant}(i, f_{j\;(or\;jj)})$ | Antenna gain in primary reception station at reference point i in channel $f_j$(or $f_{jj}$) |
| $L_f(i, f_{j\;(or\;jj)})$ | Fader loss in primary reception station at reference point i in channel $f_j$(or $f_{jj}$) |

For example, regarding the protection ratio PR in Table 1, the following idea can be applied. In other words, the acceptable interference amount to the primary system that uses a channel $f_{BS}$ from the secondary system that secondarily uses a channel $f_{CR}$ is $I_{acceptable}$. In addition, a required reception power of the primary system is $P_{req}(f_{BS})$. The following formula is established between these parameters.

$$I_{acceptable} = P_{req}(f_{BS})/PR(f_{CR} - f_{BS}) \quad (14)$$

Note that when the protection ratio is represented in the decibel value expression, the following formula can be used instead of the above Formula (14).

$$I_{acceptable} = P_{req}(f_{BS})/10^{PR(f_{CR}-f_{BS})/10} \quad (15)$$

The loss component H in Formula (13) depends, for example, on selectivity and leakage ratio of the adjacent channels. Note that the above-provided Non-Patent Document 1 should be referenced for more details of these gain component and loss component.

In the fourth power allocation method, for each frequency channel, the power allocation unit 140, after tentatively distributing the transmission power to secondary systems that secondarily uses the frequency channel, redistributes the tentatively distributed transmission power in consideration of the effect of the interference between channels. The power allocation unit 140, then, corrects the redistributed transmission power so as to satisfy the above evaluation formula.

More specifically, the power allocation unit 140, firstly, tentatively distributes the transmission power to each frequency channel that is used by the secondary systems in accordance with any method (e.g., Formulas (3)-(9')) explained in relation to the third power allocation method. Moreover, the power allocation unit 140 counts the interference between channels in and redistributes the transmission power among the secondary systems. For example, redistribution of the transmission power with the even method can be performed in accordance with the following Formula (16) (Formula (16') in the case of a combination with the interference-causing margin reduction method).

$$P'(f_j, k) = \frac{I_{acceptance}(i, f_j) - \sum_{jj=1}^{O_j} \sum_{kk=1}^{N_{jj}} \left\{ \begin{array}{c} P(f_{jj}, kk) \cdot L(i, f_{jj}, kk) \cdot \\ G(f_{jj}, kk) / H(f_j, f_{jj}, kk) \end{array} \right\}}{\sum_{kk=1}^{M_j} \{L(i, f_j, kk) \cdot G(f_j, kk)\}} \quad (16)$$

$$P'(f_j, k) = \frac{I_{acceptance}(i, f_j) - \sum_{jj=1}^{O_j} \sum_{kk=1}^{N_{jj}} \left\{ \begin{array}{c} P(f_{jj}, kk) \cdot L(i, f_{jj}, kk) \cdot \\ G(f_{jj}, kk) / H(f_j, f_{jj}, kk) \end{array} \right\}}{\sum_{kk=1}^{M_j} \{L(i, f_j, kk) \cdot G(f_j, kk) \cdot SM\}} \quad (16')$$

Formula (16) indicates that after the interference amount originating from the use of adjacent channels is subtracted from the acceptable interference amount of the primary system, the remaining acceptable interference amount is redistributed among the remaining secondary systems. Similarly, redistribution of the transmission power with the uneven method can be performed in accordance with the following Formula (17) (Formula (17') in the case of a combination with the interference-causing margin reduction method).

$$P'(f_j, k) = \frac{I_{acceptance}(i, f_j) - \sum_{jj=1}^{O_j} \sum_{kk=1}^{N_{jj}} \left\{ \begin{array}{c} P(f_{jj}, kk) \cdot L(i, f_{jj}, kk) \cdot \\ G(f_{jj}, kk) / H(f_j, f_{jj}, kk) \end{array} \right\}}{L(i, f_j, k) \cdot G(f_j, k) \cdot M_j} \quad (17)$$

$$P'(f_j, k) = \frac{I_{acceptance}(i, f_j) - \sum_{jj=1}^{O_j} \sum_{kk=1}^{N_{jj}} \left\{ \begin{array}{c} P(f_{jj}, kk) \cdot L(i, f_{jj}, kk) \cdot \\ G(f_{jj}, kk) / H(f_j, f_{jj}, kk) \end{array} \right\}}{L(i, f_j, k) \cdot G(f_j, k) \cdot M_j \cdot SM} \quad (17')$$

Note that, as a matter of course, weight in the weighted distribution method may be further applied to each of the above-provided formulas for redistribution.

Next, the power allocation unit 140 searches for a point at which evaluation of the interference amount based on the redistributed transmission power is the harshest in the service area of the primary system. For example, a point i' at which the interference amount is the harshest is searched as in the following Formula (18) or Formula (18').

$$i' = \underset{i}{\arg\min} \left( \begin{array}{c} I_{acceptance}(i, f_j) - \sum_{k=1}^{M_j} P'(f_j, k) \cdot L(i, f_j, k) \cdot G(f_j, k) - \\ \sum_{jj=1}^{O_j} \sum_{kk=1}^{N_{jj}} \left\{ \begin{array}{c} P'(f_{jj}, kk) \cdot L(i, f_{jj}, kk) \cdot \\ G(f_{jj}, kk) / H(f_j, f_{jj}, kk) \end{array} \right\} \end{array} \right) \quad (18)$$

$$i' = \underset{i}{\arg\min} \left( \begin{array}{c} I_{acceptance}(i, f_j) - \sum_{k=1}^{M_j} P'(f_j, k) \cdot L(i, f_j, k) \cdot G(f_j, k) \cdot \\ SM - \sum_{jj=1}^{O_j} \sum_{kk=1}^{N_{jj}} \left\{ \begin{array}{c} P'(f_{jj}, kk) \cdot L(i, f_{jj}, kk) \cdot \\ G(f_{jj}, kk) \cdot SM / H(f_j, f_{jj}, kk) \end{array} \right\} \end{array} \right) \quad (18')$$

Next, the power allocation unit 140 calculates a correction coefficient Δ of power distribution as in the following formulas based on the total interference amount and the acceptable interference amount $I_{acceptable}(i, f_j)$ at the point i'.

$$\Delta = \frac{I_{acceptance}(i', f_j)}{\sum_{k=1}^{M_j} P'(f_j, k) \cdot L(i', f_j, k) \cdot G(f_j, k) + \sum_{jj=1}^{O_j} \sum_{kk=1}^{N_{jj}} \left\{ \begin{array}{l} P'(f_{jj}, kk) \cdot L(i', f_{jj}, kk) \cdot \\ G(f_{jj}, kk) / H(f_j, f_{jj}, kk) \end{array} \right\}} \quad (19)$$

$$\Delta = \frac{I_{acceptance}(i', f_j)}{\sum_{k=1}^{M_j} P'(f_j, k) \cdot L(i', f_j, k) \cdot G(f_j, k) \cdot SM + \sum_{jj=1}^{O_j} \sum_{kk=1}^{N_{jj}} \left\{ \begin{array}{l} P'(f_{jj}, kk) \cdot L(i', f_{jj}, kk) \cdot \\ G(f_{jj}, kk) \cdot SM / H(f_j, f_{jj}, kk) \end{array} \right\}} \quad (19')$$

Note that the above Formula (19') can be used when the interference-causing margin reduction method is applied in power distribution.

Then, the power allocation unit 140 corrects the transmission power in accordance with the following formula by using the calculated correction coefficient $\Delta$, and derives the acceptable transmission power $P''(f_j, k)$ of the secondary system k.

$$P''(f_j, k) = P'(f_j, k) \cdot \Delta \quad (20)$$

(Combination of Power Allocation Methods)

The power allocation unit 140 may, for example, apply any one of the above second to the fourth power allocation methods to a group of secondary systems of which a distance from a primary system is less than a distance threshold value and may apply the above first method to the other secondary systems. In addition, the power allocation unit 140 may apply the above third or fourth method to the group of secondary systems of which the distance from the primary system is less than a distance threshold value and may apply the above first or second method to the other secondary systems. Furthermore, the power allocation unit 140 may apply the above fourth method to the group of secondary systems of which the distance from the primary system is less than a distance threshold value and may apply one of the above first to third power allocation methods to the other secondary systems. The following table shows an example of combinations of power allocation methods that can be applied to each of the two groups of the secondary systems. Combinations marked with circles in the table can be selected by the power allocation unit 140.

TABLE 2

EXAMPLES OF COMBINATIONS OF APPLICABLE POWER ALLOCATION METHODS

| | POWER ALLO- CATION METHOD | GROUP OF CLOSER SS | | | |
|---|---|---|---|---|---|
| | | FIRST METHOD | SECOND METHOD | THIRD METHOD | FOURTH METHOD |
| GROUP OF MORE DISTANT SS | FIRST METHOD | | ◯ | ◯ | ◯ |
| | SECOND METHOD | | | ◯ | ◯ |
| | THIRD METHOD | | | | ◯ |
| | FOURTH METHOD | | | | |

As in the third and the fourth power allocation methods, when the power allocation method based on the acceptable interference amount is applied to each of groups, the acceptable interference amount may be distributed to each of the groups in accordance with a distance or path loss between a reference point and a representative system of each group. The reference point used to distribute the acceptable interference amount among groups may be defined in advance or may be dynamically determined in accordance with the positions of the secondary systems.

Note that in the above-described third power allocation method, the correction of the acceptable transmission power in Formula (10) to Formula (12) may be omitted. Similarly, in the above-described fourth power allocation method, the correction of the acceptable transmission power in Formula (18) to Formula (20) may be omitted. As a power allocation method separate from the third and fourth power allocation methods, a method in which these corrections of the acceptable transmission power are omitted may be employed and such a method may be applied to a group closer to the primary system or to a group more distant from the primary system.

Moreover, the power allocation unit 140 may divide the secondary systems into three or more groups by using plural distance threshold values, and for each of the three or more groups, different power allocation methods may be selected. The distance threshold value used by the power allocation unit 140 may be defined in a fixed manner. Alternatively, the distance threshold value may be dynamically set in accordance with parameters such as conditions of the primary system (e.g., the size of the service area, the position of the primary reception station, or the number of primary reception stations) or the number of secondary systems.

The power allocation unit 140 calculates the value of the transmission power allocated for each of the secondary system in this manner with the method selected in accordance with the distance from the primary system, and notifies each of the secondary systems of the calculated transmission power value via the communication unit 110.

[2-2. Flow of Process]

Figure 6:
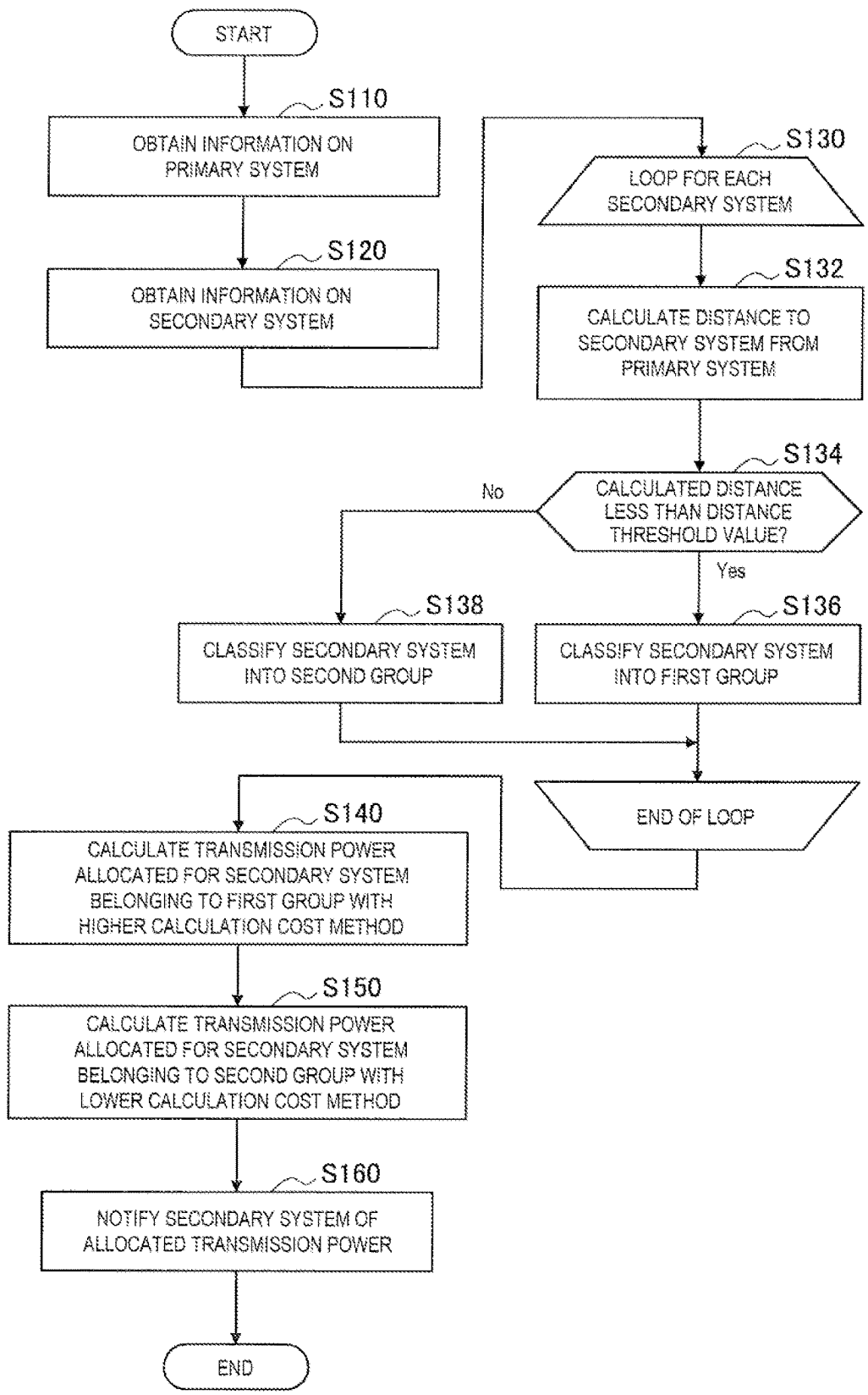
FIG. 6 is a flowchart illustrating an exemplary flow of a power allocation process according to one embodiment.

Next, by using FIG. 6, a flow of process performed by the communication control device 100 according to the present embodiment is explained. FIG. 6 is a flowchart illustrating an example of a flow of a power allocation process performed by the communication control device 100. Here, as an example, the secondary systems are grouped into two groups by using one distance threshold value.

With reference to FIG. 6, the power allocation unit 140, firstly, obtains information on the primary system provided from the data server 30 (step S110). The power allocation unit 140 also obtains information on the secondary system collected from the master node 200 (step S120). Next, the power allocation unit 140 repeats processes in steps S132 to S138 for each of target secondary systems for which power is allocated (step S130).

In the repeating process for each secondary system, the power allocation unit 140 calculates a distance from the primary system to the target secondary system (step S132). Next, the power allocation unit 140 compares the calculated distance with a prescribed distance threshold value (step S134). Here, when the distance from the primary system to the target secondary system is less than the distance threshold value, the power allocation unit 140 classifies the target secondary system into the first group (step S136). Meanwhile, when the distance from the primary system to the target secondary system does not exceed the distance threshold value, the power allocation unit 140 classifies the target secondary system into the second group (S138).

When the classification of the secondary systems is completed, the power allocation unit 140 calculates the transmission power allocated for the secondary systems that belong to the first group with a method with a greater computational cost (step S140). The power allocation method selected here may be any one of the above-described second to fourth methods.

In addition, the power allocation unit 140 calculates (or determines) the transmission power allocated for the secondary system that belongs to the second group with a method with a computational cost lower than that of the method selected in step S140 (step S150). The power allocation method selected here may be any one of the above-described first to third methods.

The power allocation unit 140, then, notifies the master node 200 of the secondary systems of the transmission power value calculated in steps S140 and S150 via the communication unit 110 (step S160). Note that the notification of step S160 in FIG. 6 can be equivalent to the transmission of a power notification message in step S17. For the secondary system of which the allocated transmission power is not updated from the value that has been notified, the notification of the transmission power value may be omitted.

3. Exemplary Configuration of Master Node

Figure 7:
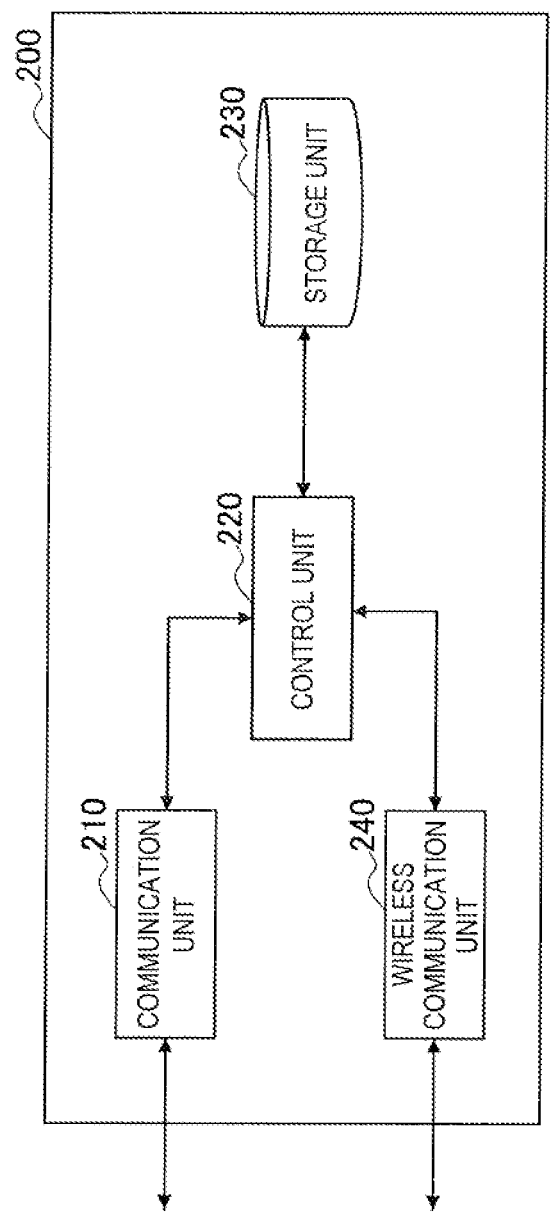
FIG. 7 is a block diagram illustrating of an exemplary configuration of a master node of the secondary system according to one embodiment.

FIG. 7 is a block diagram illustrating an example of a configuration of a master node 200 that is a communication device operating the secondary system by using the transmission power allocated by the above-described communication control device 100. With reference to FIG. 7, the master node 200 is provided with a communication unit 210, a control unit 220, a storage unit 230, and a wireless communication unit 240.

The communication unit 210 operates as a communication interface for communication between the data server 30 and the communication control device 100 by the master node 200. The communication unit 210, under a control by the control unit 220, transmits information on the secondary system to the data server 30, for example, at the start of the secondary usage. Additionally, the communication unit 210 receives information notified from the data server 30. Moreover, the communication unit 210 transmits and receives a request for power allocation and acknowledge to and from the communication control device 100. Further, the communication unit 210 receives the power notification message from the communication control device 100 to output the received message to the control unit 220.

The control unit 220 corresponds to a processor such as CPU or DSP. The control unit 220 operates various functions of the master node 200 by executing programs stored in the storage unit 230 or other storage media. For example, the control unit 220 suppresses the interference to the primary system at the time of secondary system operation by cooperating with the communication control device 100 in accordance with the sequence exemplified in FIG. 4. More specifically, the control unit 220 sets the transmission power within a range of the transmission power allocated to the master node 200 (or the secondary system operated by the master node 200), which is notified from the communication control device 100, to the wireless communication unit 240. The control unit 220 may, for example, distribute the allocated transmission power among nodes that participate in the secondary system.

The storage unit 230 uses a storage medium such as a hard disk or semiconductor memory to store a program and data used for cooperation with the communication control device 100 and operation of the secondary system.

The wireless communication unit 240 operates as a wireless communication interface for wireless communication between the master node 200 and the slave nodes connected with the relevant master node 200. The wireless communication unit 240 transmits and receives a wireless signal to and from one or more slave nodes in accordance with IEEE802.22, IEEE802.11af, or ECMA-392, for example. The transmission power of the wireless signal transmitted by the wireless communication unit 240 may be controlled within the above described range of the allocable transmission power by the control unit 220.

4. Conclusion

Up to this point, an embodiment of a technology according to the present disclosure is explained in detail by using FIG. 1 to FIG. 7. According to the above-described embodiment, when transmission power is allocated for a secondary system that secondarily uses a frequency channel protected for a primary system, power allocation methods are switched between the first group of secondary systems of which a distance from the primary system is less than a prescribed threshold and the second group of secondary systems of which the distance from the primary system exceeds the threshold. Accordingly, for secondary systems that are located farther from the primary system, calculation load for power allocation can be suppressed by employing a simple power allocation method with low computational cost. In addition, even if the transmission power is allocated with a simple method for the secondary systems that are located far in the distance and cause only a low level interference, detrimental effects on the primary system can be prevented.

According to the above-described embodiment, the simple power allocation method may be, for example, a method that does not depend on path loss on a path from a secondary system to a primary system. In this case, for the secondary systems that are located farther away, the transmission power to be allocated for the secondary system can be determined without substantial calculation load. Moreover, the simple power allocation method may be a method that does not take an accumulative interference to the primary system into consideration. In this case, for the secondary systems that are located farther away, the transmission power can be easily allocated independently with a calculation for each secondary system. Furthermore, the simple power allocation method may be a method that does not take an interference from the secondary system to the primary system between channels into consideration. In this case, for the secondary systems that are located farther away, the transmission power can be distributed independently for each frequency channel.

Note that a series of control processes by the respective devices explained in this description may be achieved by any of software, hardware, and combination of software and hardware. Programs constituting the software are stored in a storage medium provided inside or outside each device in advance, for example. Then, each program is, for example, read into a RAM (Random Access Memory) when executed to be executed by a processor such as a CPU (Central Processing Unit).

In the above descriptions, preferred embodiments of the present disclosure are described in detail with reference to the appended drawings, but the technical scope of the present disclosure is not limited to these examples. It is apparent for those who have ordinary knowledge in the technical field of the present disclosure to arrive ideas of various modification examples or correction examples within the scope of technical ideas described in the claims, and such modification examples and correction examples are also construed as pertaining to the technical scope of the present disclosure.

Additionally, the present technology may also be configured as below.

(1) A communication control device including
a power allocation unit configured to allocate transmission power for secondary use of a frequency channel protected for a primary system to a secondary system,
wherein the power allocation unit switches power allocation methods between a first group of secondary systems of which a distance from the primary system is less than a prescribed threshold and a second group of secondary systems of which a distance from the primary system exceeds the prescribed threshold.

(2) The communication control device according to (1),
wherein a power allocation method selected for the first group is a method that depends on a path loss regarding each secondary system, and
wherein a power allocation method selected for the second group is a method that does not depend on a path loss regarding each secondary system.

(3) The communication control device according to (1),
wherein a power allocation method selected for the first group is a method that considers accumulative interferences from a plurality of secondary systems to the primary system, and
wherein a power allocation method selected for the second group is a method that does not consider accumulative interferences from a plurality of secondary systems to the primary system.

(4) The communication control device according to (1),
wherein a power allocation method selected for the first group is a method that considers both an interference from a secondary system to the primary system on a same channel and an interference between channels, and
wherein a power allocation method selected for the second group is a method that does not consider the interference from a secondary system to the primary system between channels.

(5) The communication control device according to any one of (2) to (4),
wherein the power allocation method selected for the second group is a method to allocate a fixed value or a value requested from each secondary system as a transmission power value to each secondary system.

(6) The communication control device according to (3) or (4),
wherein the power allocation method selected for the second group is a method to allocate, to the secondary system, a larger transmission power value as a path loss from each secondary system to the primary system becomes larger.

(7) The communication control device according to (4),
wherein the power allocation method selected for the second group is a method to distribute transmission power into each secondary system so that an accumulative interference amount on a same channel from a plurality of secondary systems to the primary system does not exceed an acceptable interference amount of the primary system.

(8) The communication control device according to any one of (2) to (4),
wherein the power allocation method selected for the first group is a method to distribute transmission power to each secondary system so that a sum of an accumulative interference amount on a same channel from a plurality of secondary systems to the primary system and an accumulative interference amount between channels does not exceed an acceptable interference amount of the primary system.

(9) The communication control device according to (2) or (3),
wherein the power allocation method selected for the first group is a method to distribute transmission power into each secondary system so that an accumulative interference amount on a same channel from a plurality of secondary systems to the primary system does not exceed an acceptable interference amount of the primary system.

(10) The communication control device according to (2),
wherein the power allocation method selected for the first group is a method to allocate, to the secondary system, a larger transmission power value as a path loss from each secondary system to the primary system becomes larger.

(11) A method for allocating transmission power for secondary use of a frequency channel protected for a primary system to a secondary system, the method including:
obtaining a distance to the secondary system from the primary system;
allocating transmission power to the secondary system with the first power allocation method when the obtained distance is less than a prescribed threshold; and
allocating transmission power to the secondary system with the second power allocation method that requires calculation cost lower than that of the first power allocation method when the obtained distance exceeds the prescribed threshold.

(12) A program for causing a computer of a communication control device to function as
a power allocation unit to allocate transmission power for secondary use of a frequency channel protected for a primary system to a secondary system,
wherein the power allocation unit switches power allocation methods between a first group of secondary systems of which a distance from the primary system is less than a prescribed threshold and a second group of secondary systems of which a distance from the primary system exceeds the prescribed threshold.

REFERENCE SIGNS LIST

1 communication control system
10 primary transmission station
20 primary reception station
100 communication control device
140 power allocation unit
200 master node of secondary system

The invention claimed is:
1. A communication control device comprising:
a memory storage device to store a program; and
a processing device which upon executing the program from the memory storage device operates as a power allocation unit to perform an allocation process in which transmission power is allocated for secondary use of a frequency channel protected for a primary system to a secondary system, wherein the power allocation unit switches power allocation methods between a first group of secondary systems of which a distance from the primary system is less than a prescribed threshold and a second group of secondary systems of which a distance from the primary system exceeds the prescribed threshold, wherein a power allocation method selected for the first group is a method that considers accumulative interferences from a plurality of secondary systems to the primary system, and wherein a power allocation method selected for the second group is a method that does not consider accumulative interferences from a plurality of secondary systems to the primary system.

2. The communication control device according to claim 1, wherein the power allocation method selected for the second group is a method to allocate, to the secondary system, a larger transmission power value as a path loss from each secondary system to the primary system becomes larger.

3. A communication control device comprising:

a memory storage device to store a program; and a processing device which upon executing the program from the memory storage device operates as a power allocation unit to perform an allocation process in which transmission power is allocated for secondary use of a frequency channel protected for a primary system to a secondary system, wherein the power allocation unit switches power allocation methods between a first group of secondary systems of which a distance from the primary system is less than a prescribed threshold and a second group of secondary systems of which a distance from the primary system exceeds the prescribed threshold, and wherein the power allocation method selected for the first group is a method to distribute transmission power to each secondary system so that a sum of an accumulative interference amount on a same channel from a plurality of secondary systems to the primary system and an accumulative interference amount between channels does not exceed an acceptable interference amount of the primary system.

4. A communication control device comprising:

a memory storage device to store a program; and a processing device which upon executing the program from the memory storage device operates as a power allocation unit to perform an allocation process in which transmission power is allocated for secondary use of a frequency channel protected for a primary system to a secondary system, wherein the power allocation unit switches power allocation methods between a first group of secondary systems of which a distance from the primary system is less than a prescribed threshold and a second group of secondary systems of which a distance from the primary system exceeds the prescribed threshold, wherein a power allocation method selected for the first group is a method that depends on a path loss regarding each secondary system, wherein a power allocation method selected for the second group is a method that does not depend on a path loss regarding each secondary system, and wherein the power allocation method selected for the first group is a method to allocate, to the secondary system, a larger transmission power value as a path loss from each secondary system to the primary system becomes larger.

* * * * *